(12) United States Patent
Krothapalli

(10) Patent No.: US 7,923,168 B2
(45) Date of Patent: Apr. 12, 2011

(54) MICROJET REACTANT DELIVERY SYSTEM FOR USE IN FUEL CELLS

(75) Inventor: Anjaneyulu Krothapalli, Talahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 921 days.

(21) Appl. No.: 11/805,961

(22) Filed: May 25, 2007

(65) Prior Publication Data

US 2007/0275289 A1 Nov. 29, 2007

Related U.S. Application Data

(60) Provisional application No. 60/808,836, filed on May 26, 2006.

(51) Int. Cl.
*H01M 8/04* (2006.01)
*H01M 8/22* (2006.01)

(52) U.S. Cl. .................. 429/505; 429/513; 429/515

(58) Field of Classification Search .................. 429/505, 429/513–515
See application file for complete search history.

(56) References Cited

U.S. PATENT DOCUMENTS

| | | | | |
|---|---|---|---|---|
| 3,134,697 | A * | 5/1964 | Niedrach | 429/480 |
| 6,099,984 | A * | 8/2000 | Rock | 429/492 |
| 2006/0183006 | A1 * | 8/2006 | Liu et al. | 429/13 |
| 2006/0183008 | A1 * | 8/2006 | Finkelshtain et al. | 429/13 |

* cited by examiner

*Primary Examiner* — Karie O'Neill Apicella
(74) *Attorney, Agent, or Firm* — J. Wiley Horton

(57) ABSTRACT

A new reactant delivery system for delivering reactants to the membrane electrode assembly of a fuel cell. The invention uses a plurality of small holes to propel high-velocity streams of reactant gases ("microjets") against an impingement plate. The microjets assist in catalyzing the reactant gases and forcing them toward the proton exchange membrane. Reactant gas flow is primarily perpendicular to the orientation of the proton exchange membrane, thereby enhancing diffusion rates. In addition, each microjet acts like an expansion valve, which significantly cools the flowing gas and provides internal heat absorption. This internal heat absorption permits higher energy densities in the fuel cell.

14 Claims, 15 Drawing Sheets

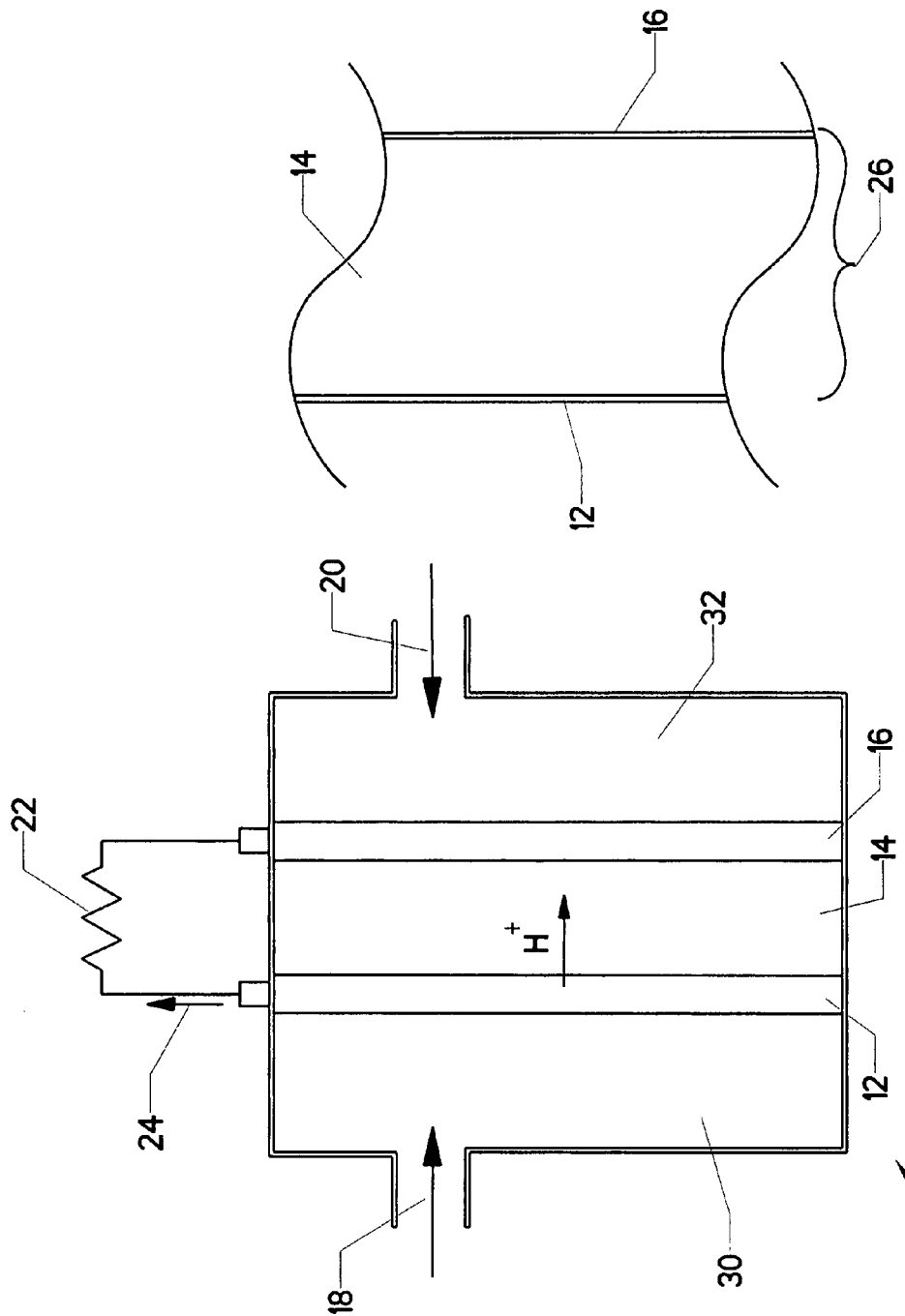

MICROJET REACTANT DELIVERY SYSTEM FOR USE IN FUEL CELLS

CROSS-REFERENCES TO RELATED APPLICATIONS

This is a nonprovisional application claiming the benefit of the filing date of Provisional Application No. 60/808,836 which was filed on May 26, 2006 and names the same inventor.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION

1. Field of the Invention

This invention relates to the field of fuel cells. More specifically, the invention comprises a novel reactant delivery system in which microjets direct a stream of gas against an impingement plate.

2. Description of the Related Art

Proton Exchange Membrane ("PEM") fuel cells have undergone extensive development since the 1950's. The first practical application occurred during the Gemini space flights of the 1960's. While a complete explanation of the operation of PEM fuel cells is beyond the scope of this disclosure, the reader may benefit from a simple explanation.

FIG. 1 shows a prior art PEM fuel cell in schematic form. This particular fuel cell uses gaseous hydrogen and gaseous oxygen as its reactants. Proton exchange membrane ("PEM") 14 lies at the center of the device and is the key to its operation. When properly conditioned, this membrane will allow hydrogen ions to pass through, but will not allow the passage of electrons. In operation, hydrogen inlet 18 supplies hydrogen gas (a "reactant") to hydrogen manifold 30. Catalysts such as platinum or palladium strip the electrons from the hydrogen atoms to form hydrogen ions and free electrons. The catalysts are typically located on the exterior of the PEM.

The hydrogen ions flow through porous anode 12, through PEM 14, and into porous cathode 16. At that point the hydrogen ions combine with oxygen supplied by oxygen manifold 32 to produce water. Oxygen inlet 20 supplies a suitable flow of gaseous oxygen.

The free electrons are unable to pass through PEM 14 because the membrane is electrically insulating. They are forced instead to flow through an electrical circuit including electrical load 22. Electron flow 24 therefore provides electrical power to an external load, which is the primary purpose of the fuel cell. The "waste product" is water, which obviously poses no environmental concerns.

FIG. 2 shows a section through anode 12, proton exchange membrane 14, and cathode 16. These three components are typically laminated together to form membrane electrode assembly ("MEA") 26. The anode and cathode are typically very thin (less than a millimeter). They may actually be formed by vapor deposition or electro deposition processes. Because the entire MEA must allow the passage of hydrogen ions, the anode and cathode (collectively referred to as the "electrodes") must be porous.

The catalyst or catalysts are often also formed on the exterior of the MEA itself. Gas diffusion layer (GDL) is also typically added to the MEA's exterior in order to evenly distribute the fuel and oxidizer over the catalyst. The inclusion of the GDL can reduce the amount of catalyst needed.

The reader having an interest in further details regarding the nature of MEA's is referred to U.S. Pat. No. 3,134,697 to Niedrach (1964) and U.S. Pat. No. 6,099,984 to Rock (2000). Both these patents are hereby incorporated by reference in this disclosure.

FIGS. 1 and 2 provide a basic explanation of PEM fuel cell operation. However, as one might reasonably expect, the physical realization of the device is much more complex. Because fuel cells were critical to long term operations in space, fuel cell development was a critical obstacle in the moon race of the 1960's. PEM and MEA development took many thousands of man-hours.

FIG. 3 shows a simplified depiction of a PEM fuel cell. Membrane exchange assembly 26 includes a proton exchange membrane 14 sandwiched between anode 12 and cathode 16. The anodes and cathodes are depicted as hatched lines to indicate their thin and porous nature. The depiction is not intended to show what the anode and cathode actually look like. MEA 26 would naturally include other components as well. Current collection grids and conduits would be attached to the anode and cathode. Sealing gaskets are also used. For purposes of visual clarity, these components have not been illustrated.

Membrane exchange assembly 26 is sandwiched between hydrogen manifold 30 and oxygen manifold 32. Hydrogen inlet 18 supplies hydrogen gas to the hydrogen manifold while oxygen inlet 20 supplies oxygen gas to the oxygen manifold. Hydrogen and oxygen are considered the "reactants" for this type of fuel cell.

Mechanical features are often included in the prior art to facilitate clamping the assembly together. A series of mounting holes 42 pass in alignment through all the components. Bolts can be passed through these holes and nuts will then be tightened to clamp the assembly firmly together.

Of course, if one merely feeds gaseous reactants into the manifold, the fuel cell will not operate. The reactants must be ionized, and this is typically done by a catalyst placed on the anode and cathode. Palladium is a typical catalyst which can be deposited as a thin layer on the anode and cathode.

Serpentine passage 34 is cut into the face of the oxygen manifold which bears against MEA 26. The serpentine passage allows the oxygen to flow smoothly over the catalyst, which may be deposited on the surface of the serpentine passage, the cathode surface, or both. The serpentine passage is needed to hold the gas and the catalyst in contact for a time sufficient to allow ionization.

A similar serpentine passage is cut into the surface of hydrogen manifold 30 which faces the MEA. The serpentine passages have been used in fuel cells for many years. However, their efficiency is limited. The catalyst is often exhausted in the proximity of the gas inlet long before it is exhausted in the "tail" of the serpentine passage.

In state-of-the-art fuel cells, the hydrogen and oxygen manifolds are often made of graphite. The manifolds themselves may therefore be used as electrodes, eliminating the need for separate components. The manifolds are placed in direct contact with opposing sides of the MEA so that they can conduct the electrical current created by the reaction within the fuel cell. The mounting holes may then be used to house electrical conductors, with external clamping means being used to assemble the fuel cell.

Those skilled in the art will know that the operation of a prior art fuel cell is limited by several factors. First, the appropriate amount of water must be maintained in the membrane electrode assembly in order to keep the MEA "soaked" (critical to its operation) yet not "flooded" (which will destroy the membrane's operation). This is true for most existing MEA's, with Nafion being the most commonly used PEM material.

Second, power output is often limited by internal heat generation. The fuel cell generates internal heat across the MEA and this must be dissipated. Too much heat will damage the fuel cell. Thus, increasing power is not simply a matter of pumping in more reactants. The reactant flow must be limited in order to limit the generation of heat. Thus, a fuel cell construction which reduces or absorbs heat generation would be highly beneficial.

BRIEF SUMMARY OF THE INVENTION

The present invention is a new reactant delivery system for delivering reactants to the membrane electrode assembly of a fuel cell. The invention uses a plurality of small holes to propel high-velocity streams of reactant gases ("microjets") against an impingement plate. The microjets assist in diffusing the reactant gases evenly toward the proton exchange membrane. The PEM is impregnated with catalyst on both sides, so that the flowing gases come in contact with the catalyst.

Reactant gas flow is primarily perpendicular to the orientation of the proton exchange membrane, thereby enhancing diffusion rates. In addition, each microjet acts like an expansion valve, which significantly cools the flowing gas. The cooled gas returns to near-ambient conditions as it strikes the impingement plate and flows toward the MEA. However, the near-ambient temperature gas is injected directly against the MEA, the primary point of heat generation within the fuel cell. Thus, cooling is provided precisely where it is needed. The cooling effect is also quite uniform, eliminating potentially harmful localized temperature spikes. This internal heat absorption permits higher energy densities in the fuel cell.

BRIEF DESCRIPTION OF THE SEVERAL VIEWS OF THE DRAWINGS

FIG. 1 is a schematic view, showing a prior art fuel cell.

FIG. 2 is a detailed elevation view, showing a membrane electrode assembly.

Figure 3:
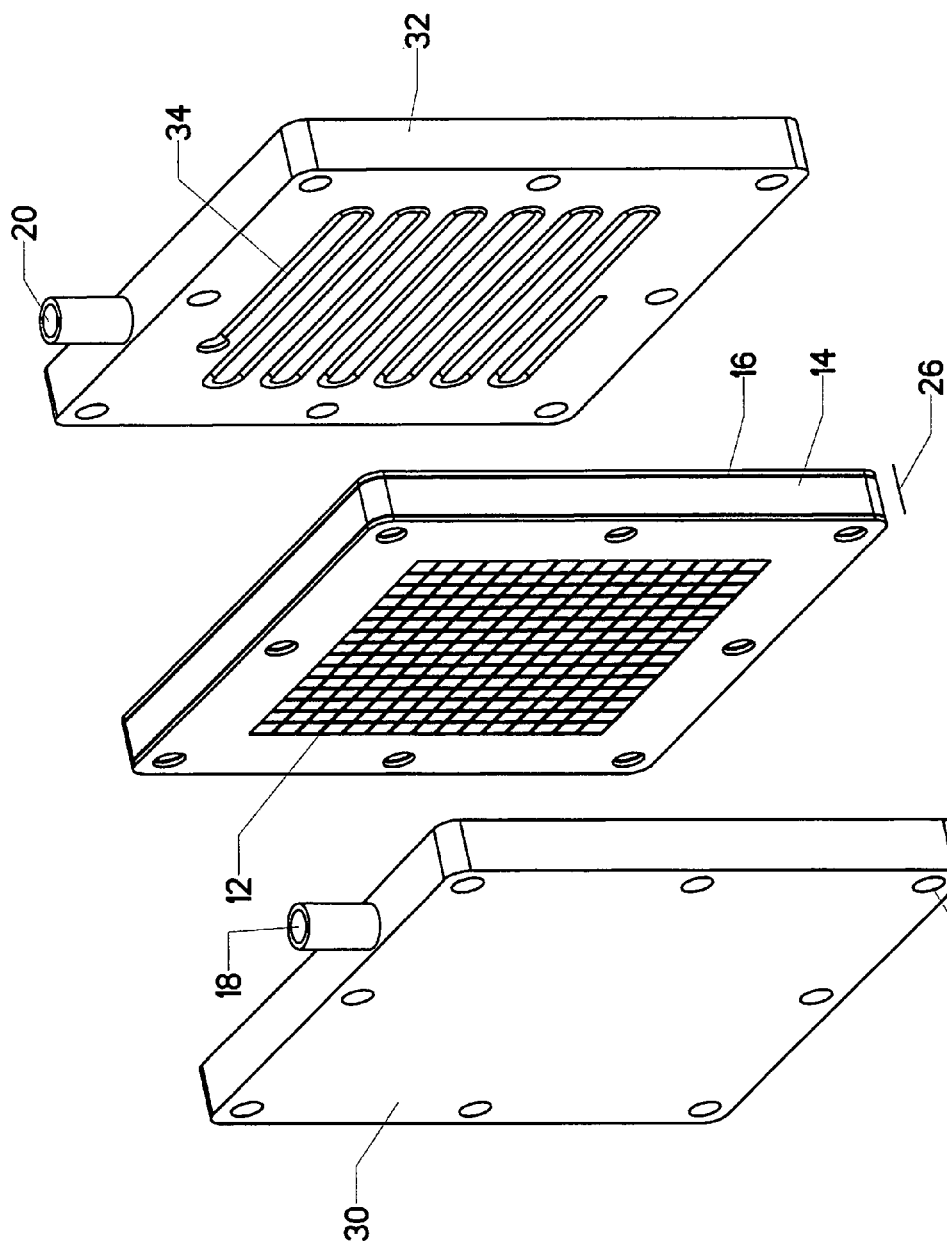
FIG. 3 is an exploded perspective view, showing a simplified physical embodiment of a prior art fuel cell.

| REFERENCE NUMERALS IN THE DRAWINGS | | | |
|---|---|---|---|
| 10 | fuel cell | 12 | anode |
| 14 | proton exchange membrane | 16 | cathode |
| 18 | hydrogen inlet | 20 | oxygen inlet |
| 22 | electrical load | 24 | electron flow |
| 26 | membrane electrode assembly | 30 | hydrogen manifold |
| 32 | oxygen manifold | 34 | serpentine passage |
| 36 | retaining plate | 38 | impingement plate |
| 41 | waste product hole | 40 | microjet plate |
| 42 | mounting hole | 43 | conduit hole |
| 44 | oxygen stagnation chamber | 45 | end plate |
| 46 | microjet hole | 47 | hydrogen stagnation chamber |
| 48 | exhaust hole | 49 | center-to-center line |
| 50 | web | 52 | gas flow |
| 54 | impingement plate recess | 61 | thinned section |
| 63 | microjet | 73 | waste product channel |
| 80 | oxygen manifold | 82 | oxygen supply line |
| 84 | stagnation chamber | 86 | microjet plate |
| 88 | impingement plate | 90 | load |
| 92 | oxygen electrode | 94 | proton exchange membrane |
| 96 | hydrogen electrode | 98 | hydrogen manifold |
| 100 | hydrogen supply line | 102 | aqueous chamber |
| 104 | threaded connector | 108 | alkaline solution |

DETAILED DESCRIPTION OF THE INVENTION

Figure 4:
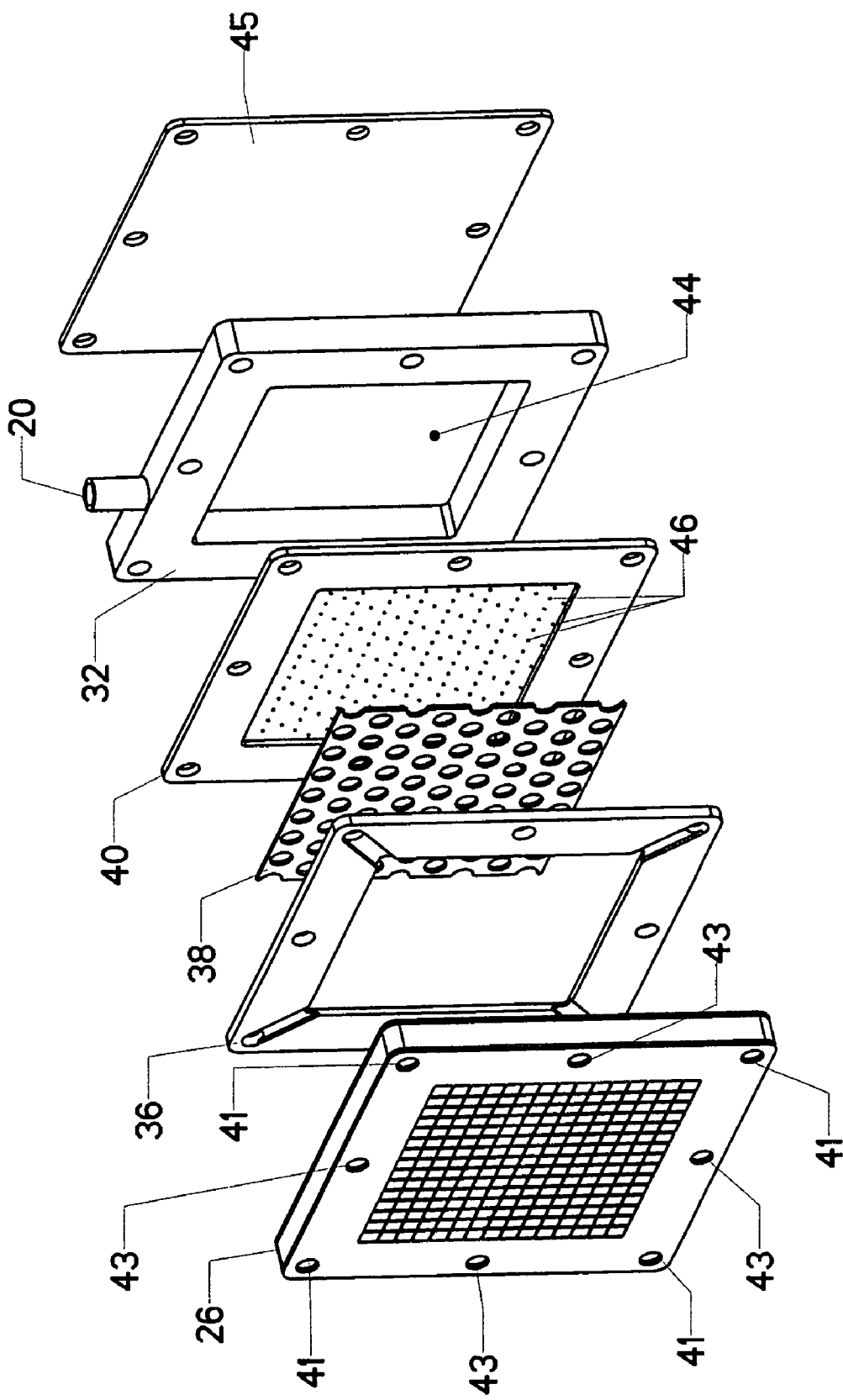
FIG. 4 is an exploded perspective view, showing the oxidant delivery system of a fuel cell made according to the present invention.

FIG. 4 shows a fuel cell incorporating the present invention. Membrane electrode assembly 26 is essentially the same as for the prior art. The example uses hydrogen (fuel) and oxygen (oxidizer) as the reactants. As for the prior art, the MEA must be sandwiched between two manifolds delivering ionized gaseous reactants. However, the method of delivering the reactants is substantially different.

FIG. 4 shows the MEA and the oxygen delivery components. The components are shown in an exploded view. When they are assembled they are all tightly clamped together using external clamping plates (not shown).

Retaining plate 36 clamps against the far side of the MEA. It retains impingement plate 38 in the correct position again microjet plate 40 when microjet plate 40 is clamped against the retaining plate. Oxygen manifold 32 is then clamped against the back side of the microjet plate. End plate 45 seals the far side of oxygen manifold 32 to form oxygen stagnation chamber 44. In operation, pressurized oxygen is fed in through oxygen inlet 20. The pressurized oxygen within oxygen stagnation chamber 44 is then forced through a plurality of microjet holes 46 in microjet plate 40.

The flow assumes the form of high velocity microjets. These impinge upon impingement plate 38, in an arrangement to be described in more detail subsequently. The gas flow then passes through exhaust holes in the impingement plate and then to the MEA. Once the oxygen leaves the oxygen stagnation chamber, it generally flows in a direction which is perpendicular to the plane of the proton exchange membrane.

The catalyst is evenly distributed on the outward-facing surfaces of the MEA. A gas diffusion layer (GDL) may also be included on the MEA, though the use of the microjet-based delivery approach will likely eliminate the need for this component.

Numerous additional components have been omitted for visual clarity. Each of the components includes a conduit hole 43 in the middle of each side and an exhaust hole 41 proximate each corner. The conduit holes house appropriately positioned electrical conductors which carry the electrical current to an external load (as well as possibly hooking up successive cells in a series connection). Waste product holes 41 house components for carrying away waste products.

Gaskets would be employed between the various layers to prevent gas leakage. Other hardware is needed to channel the water formed and to retain the proper saturation level for the MEA. All these components are well known to those skilled in the art and—accordingly—they have not been illustrated.

Figure 4B:
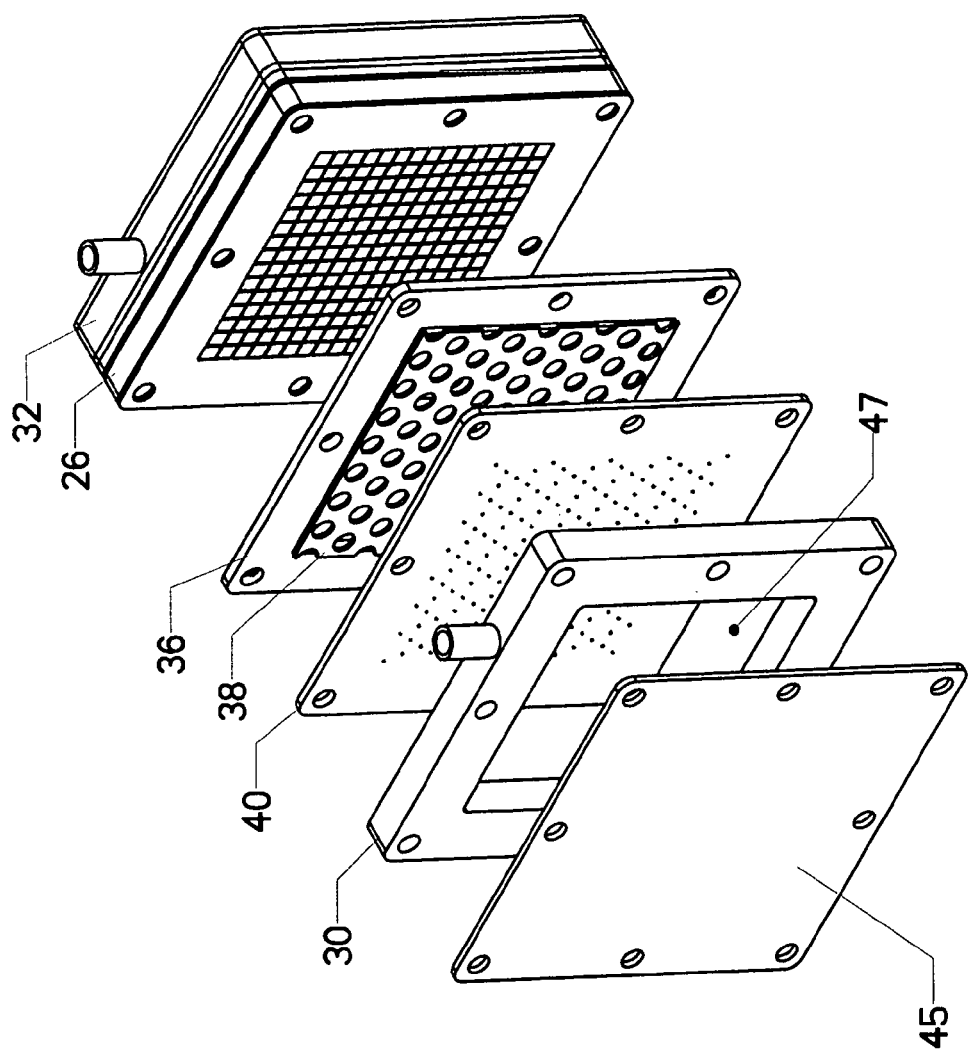
FIG. 4B is an exploded perspective view, showing the fuel cell of FIG. 4 with the fuel delivery system added.

In FIG. 4B, the MEA and the oxygen delivery components have been clamped together. The hydrogen delivery components are shown in exploded form. The reader will observe that the hydrogen components are simply the oxygen components rotated 180 degrees and attached to the opposite side of the MEA. Hydrogen manifold 30 is closed by an end plate 45, which forms hydrogen stagnation chamber 47. The hydrogen manifold clamps against the back of microjet plate 40. The microjet plate clamps against impingement plate 38, which is retained in the proper position by retaining plate 36. All the hydrogen components are then clamped against the side of the MEA which faces the viewer. The result is a completed fuel cell having one set of electrodes. The fuel cell can be stacked to form a multi-cell unit as for the prior art. The type of stacking will be explained subsequently.

Of course, those skilled in the art will realize that the microjet sizes may need to be adjusted for different reactants. Thus, while the oxygen and hydrogen microjet plates may appear to be the same, the hole sizes and separations may in fact be different.

Figure 5:
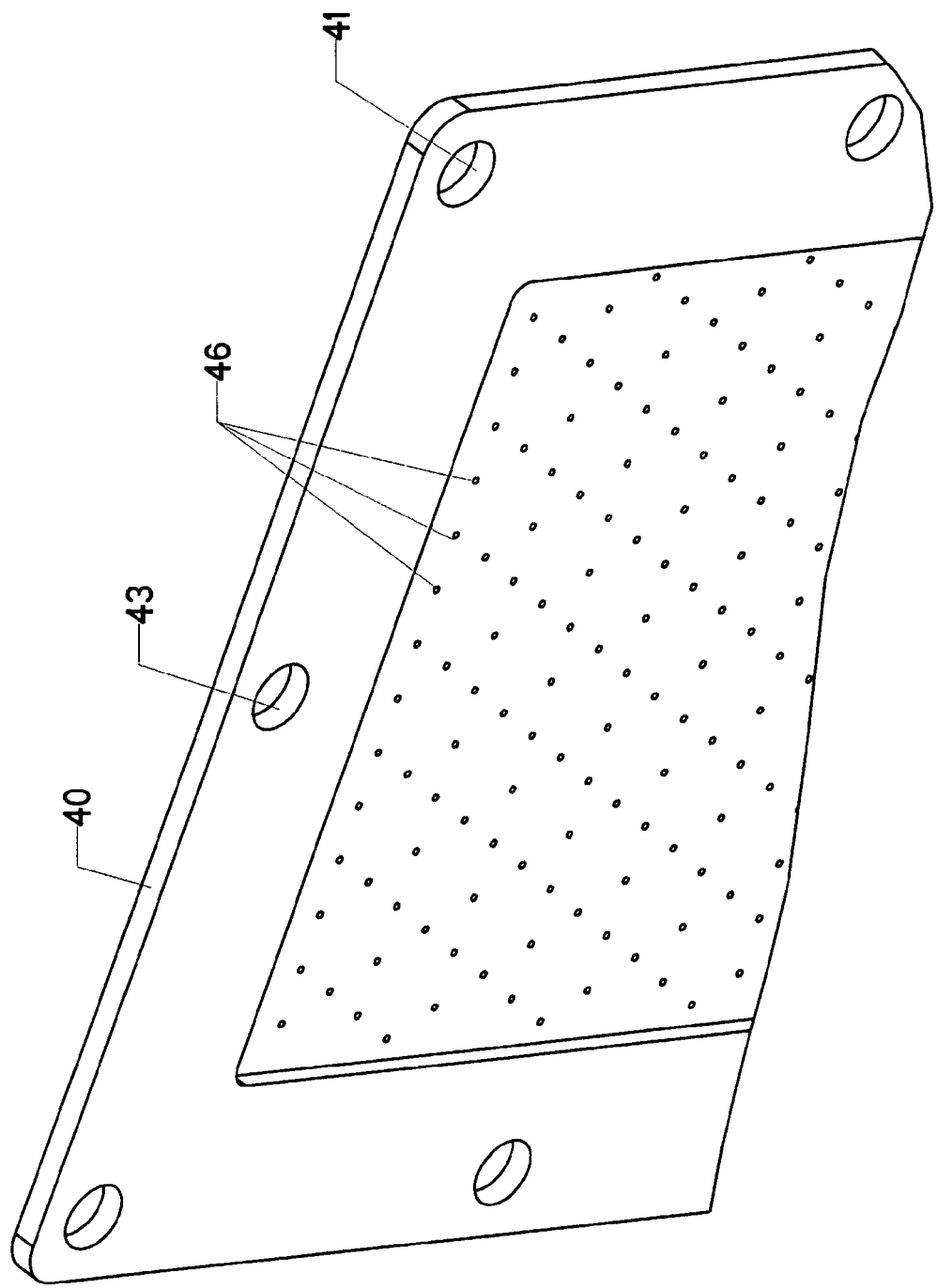
FIG. 5 is a detail view, showing details of the microjet plate.
Figure 6:
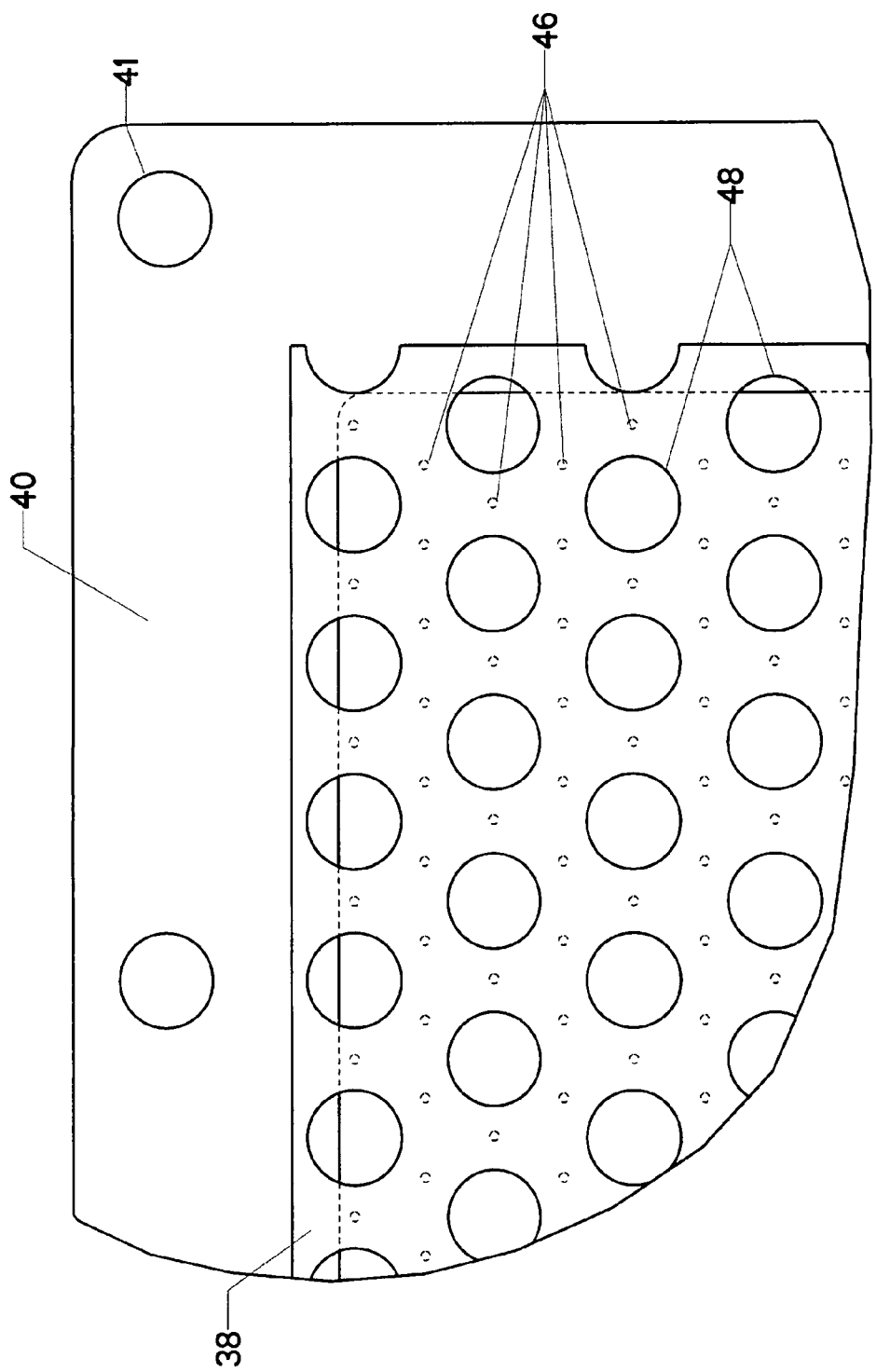
FIG. 6 is a hidden line view, showing the impingement plate laid over the microjet plate.

FIG. 5 shows a detail view of a portion of microjet plate 40. The reader will observe how the thinned section in the middle of the plate is pierced by many microjet holes 46. FIG. 6 is a hidden line view showing how impingement plate 38 lies over microjet plate 40. Impingement plate 38 includes a plurality of exhaust holes 48. The array of microjets 46 are positioned to be directly beneath the webs between the exhaust holes in the impingement plate. FIG. 6 clearly shows this alignment.

Figure 6B:
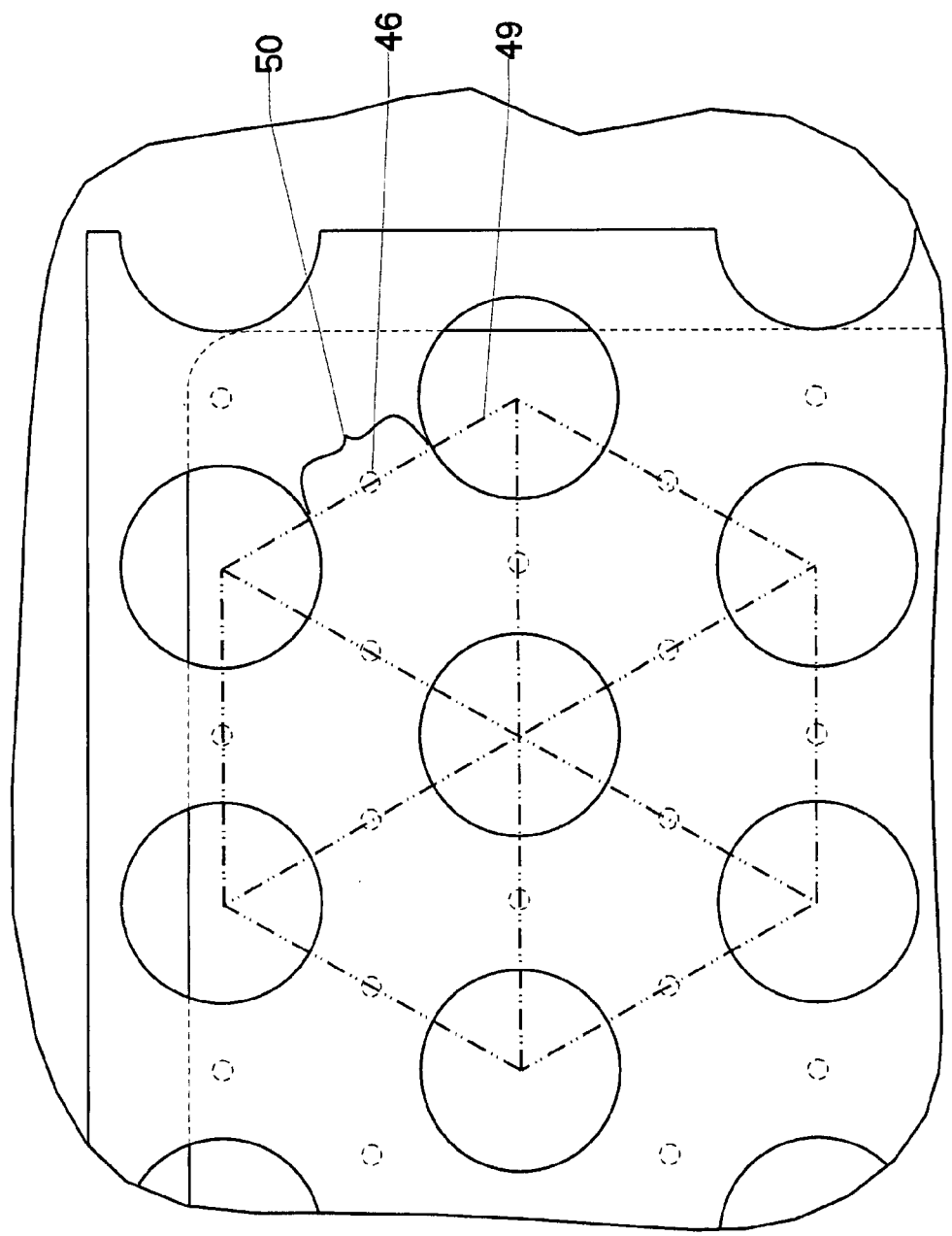
FIG. 6B is a hidden line view, showing details of how the microjets align with the webs in the impingement plate.

FIG. 6B shows the alignment in greater detail. The exhaust holes are preferably placed in a geometric pattern. Center-to-center line 49 connects the centers of adjacent exhaust holes (12 of these are shown as phantom lines in the view). Each microjet hole 46 preferably lies beneath the middle of a center-to-center line, which places each microjet hole in the center of a web 50 between adjacent exhaust holes. This alignment ensures that the microjet produced will strike a solid portion of the impingement plate, but that the "strike" will also be close to at least two exhaust holes.

Figure 7:
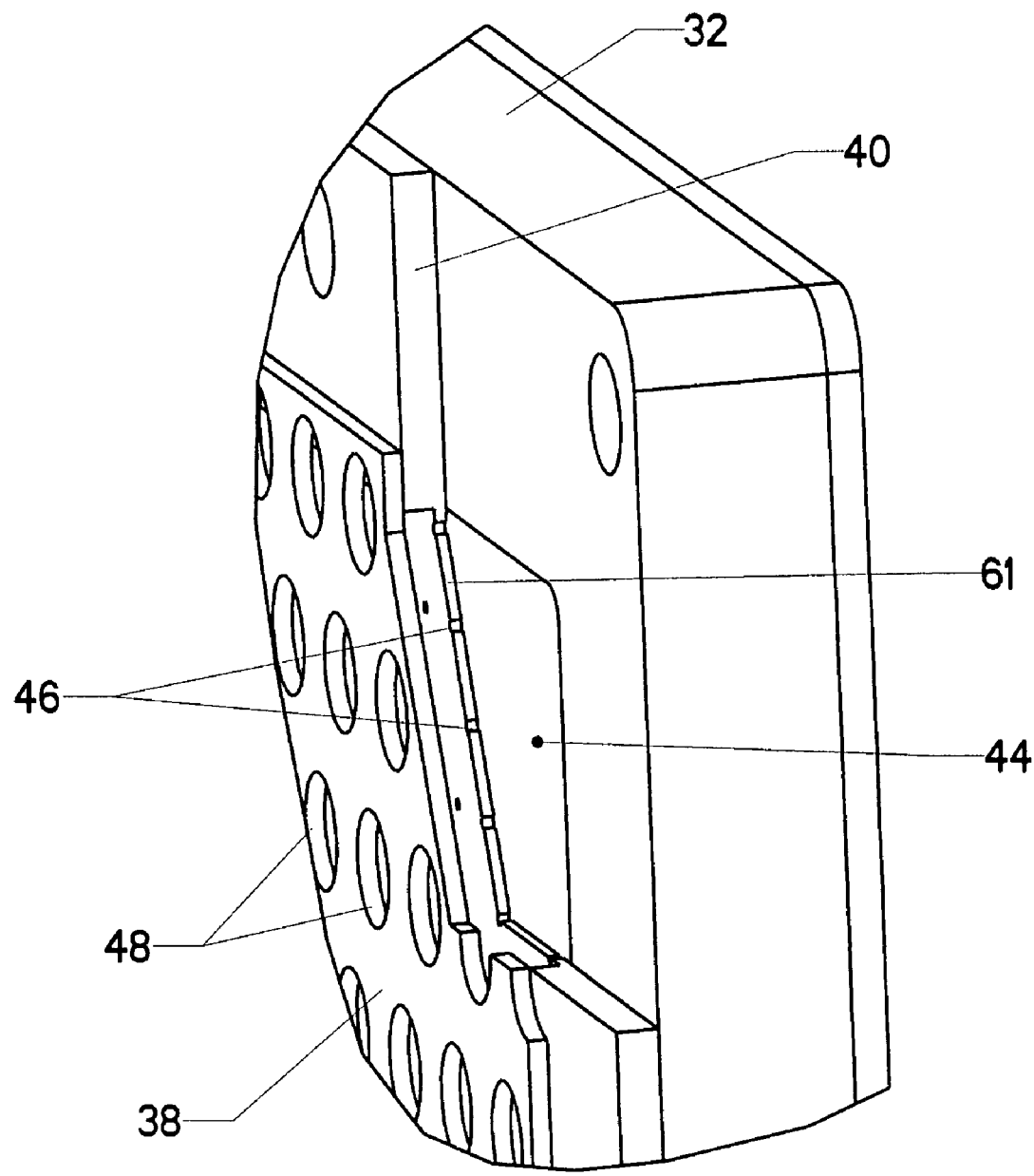
FIG. 7 is a perspective view with a cutaway, showing the interaction of the microjet plate with the impingement plate.

FIG. 7 shows a perspective view of impingement plate 38 lying over microjet plate 40 with a cutaway added to show internal details. The cutaway is angled to pass through several microjet holes 46. Pressurized oxygen within oxygen stagnation chamber 44 is forced through these holes and against impingement plate 38. A gap exists between the microjet and impingement plates, since the microjet holes are formed in thinned section 61.

Figure 7B:
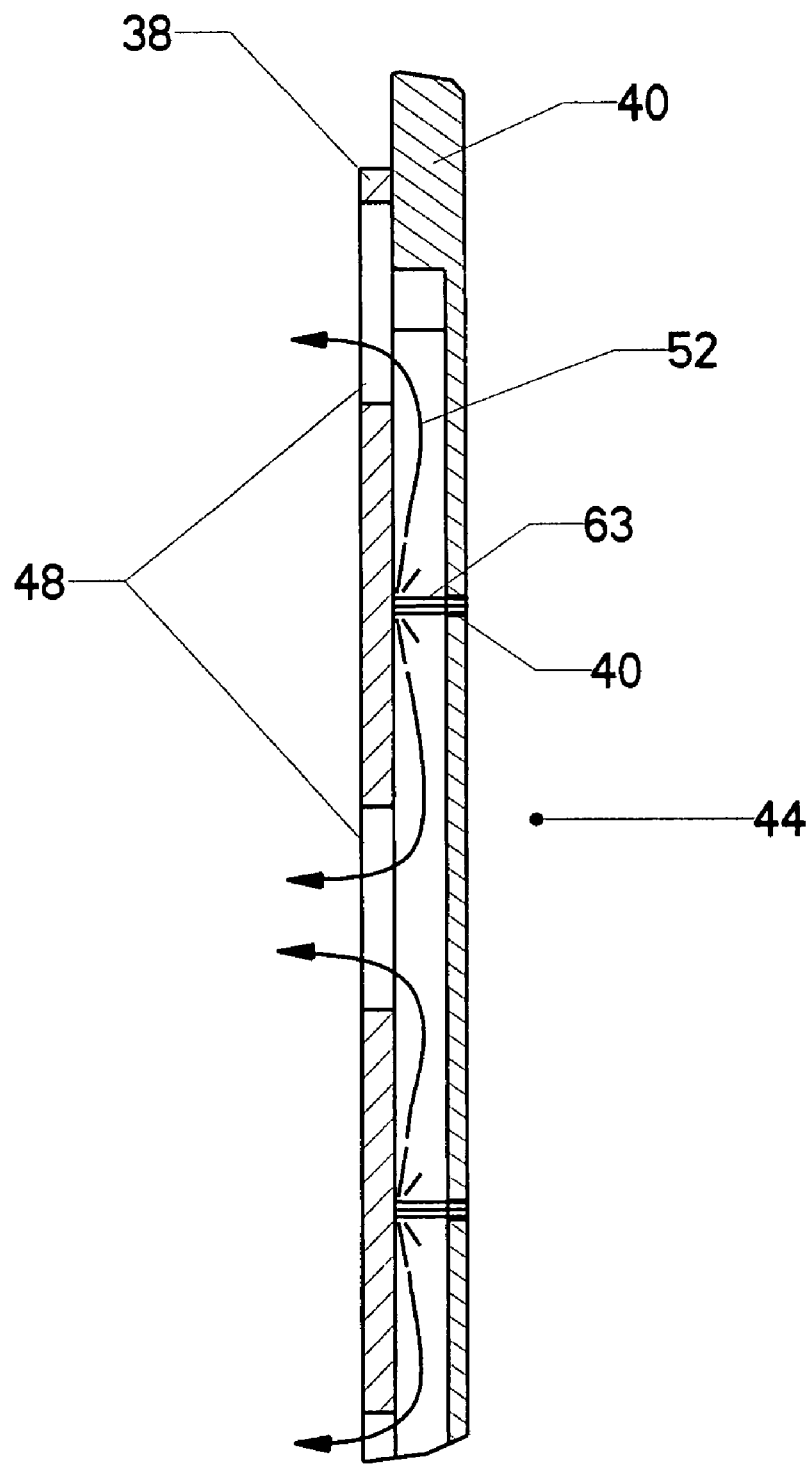
FIG. 7B is a section elevation view, showing the operation of the microjets.

FIG. 7B shows a section view through two adjacent microjet holes 46. The pressurized oxygen flowing through each of these small holes creates a microjet 63. The microjet strikes the impingement plate and diffuses the gas at high velocity. Gas flow 52 then flows through exhaust holes 48 toward the membrane electrode assembly which lies adjacent to the impingement plate. The flowing gas then reacts with the catalyst on the MEA.

Each microjet hole acts like a small expansion valve. The gas within oxygen stagnation chamber 44 is essentially stagnant. As the gas flows through the microjet hole, it accelerates to high velocity. A pressure and temperature drop results from the Bernoulli effect. Thus, if the gas enters the stagnation chamber at room temperature, it will be substantially cooled by passing through the microjets. The temperature of the flowing gas recovers to near-ambient conditions after striking the impingement plate and then flowing into the MEA. Thus, the gas entering the MEA is back to near-ambient conditions. However, this near-ambient gas is flowing directly into the point of maximum heat generation (where the reaction is occurring in the outer regions of the MEA). This fact means that cooling is provided exactly where it is needed.

In addition, the cooling is provided in a very even and controlled manner across the entire face of the MEA. Localized "hot spots" are thereby minimized. This cooling phenomenon allows the operation of fuel cells having a higher energy density. This allows a faster reactant delivery (and more extracted power) without exceeding the fuel cell's temperature limit.

The cooling mechanism also allows inexpensive materials to be used for many of the components, since high temperatures will no longer be a problem. Some or all of the components in the reactant delivery systems can be made of relatively inexpensive thermoplastics.

The even gas distribution provided by the microjet delivery system also ensures a uniform gas distribution to the catalyst on the MEA. The catalyst is thereby uniformly consumed, which means that a lesser total amount of catalyst will be needed than for the prior art devices.

Figure 8:
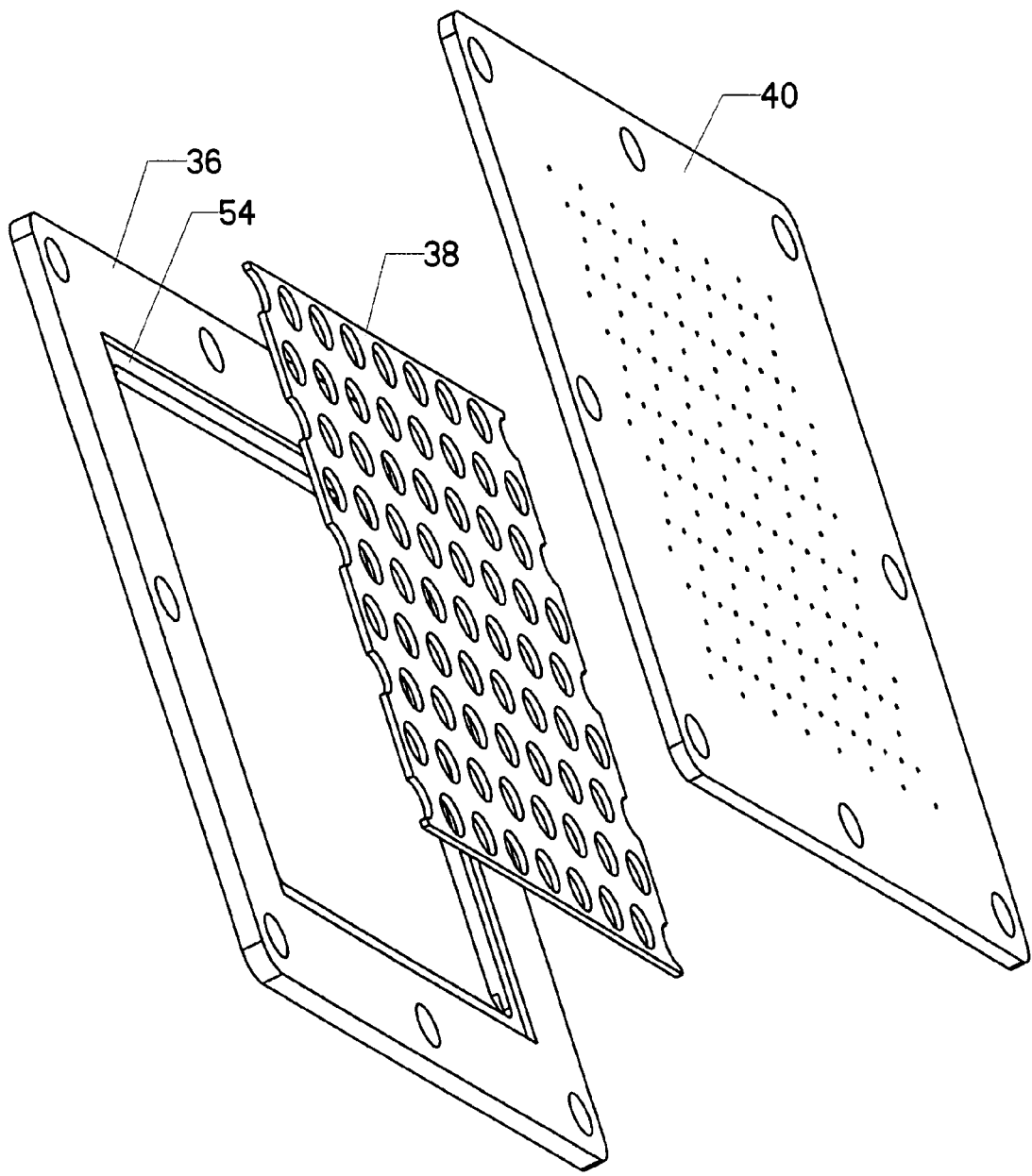
FIG. 8 is an exploded perspective view, showing the stacking of the retaining plate, the impingement plate, and the microjet plate.

FIG. 8 shows an exploded view of retaining plate 36, impingement plate 38, and microjet plate 40. Many different geometric arrangements can be made between the microjet array and the impingement plate. The alignment of the microjet holes with the webs on the impingement plate is only one effective example. However, whatever alignment is chosen, it is significant that the alignment be maintained by fixing the position of the impingement plate relative to the microjet plate. In FIG. 8, the reader will observe that the side of the retaining plate which faces the impingement plate includes impingement plate recess 54. This fits around the perimeter of the impingement plate and secures it in position.

Figure 8B:
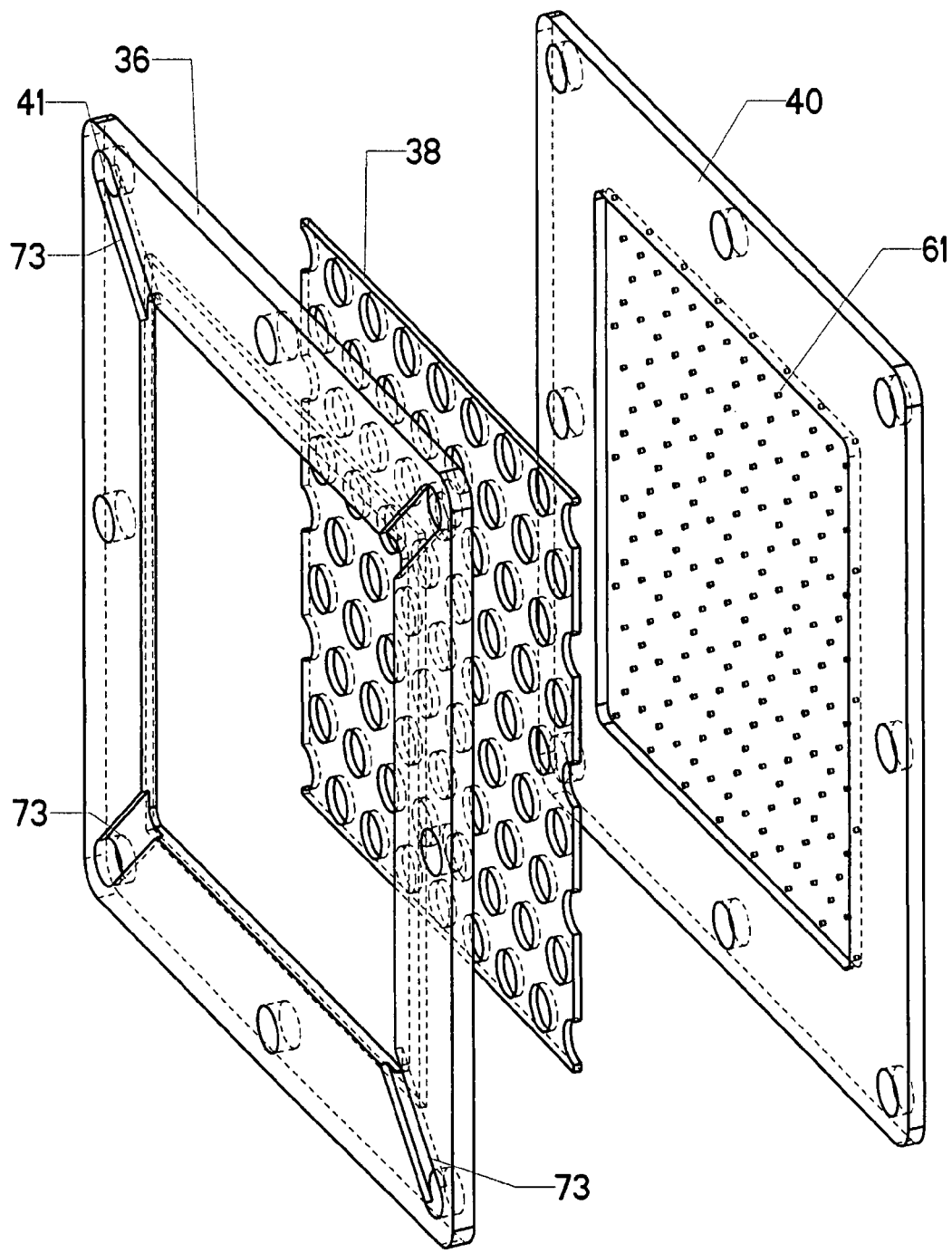
FIG. 8B is an exploded perspective view, showing the stacking of the retaining plate, the impingement plate, and the microjet plate from the opposite side.

FIG. 8B shows the same assembly from the other side. Four waste product channels 73 are contained in the side of retaining plate 36 which faces the MEA. These can be used to carry waste products to the four waste product holes 41 which carry away water in the case of a hydrogen/oxygen fuel cell.

Those skilled in the art will know that PEM fuel cells produce a relatively low electrical potential across each individual membrane electrode assembly. Thus, prior art cells are typically stacked in series in order to increase the voltage which is ultimately extracted from the stacked cells. The assembly of several mated fuel cells is actually referred to as a "stack." The nature of the prior art fuel cells, such as shown in FIG. 3, allows the stacking to proceed positive-negative-positive-negative by simply connecting adjoining cells together.

Figure 9:
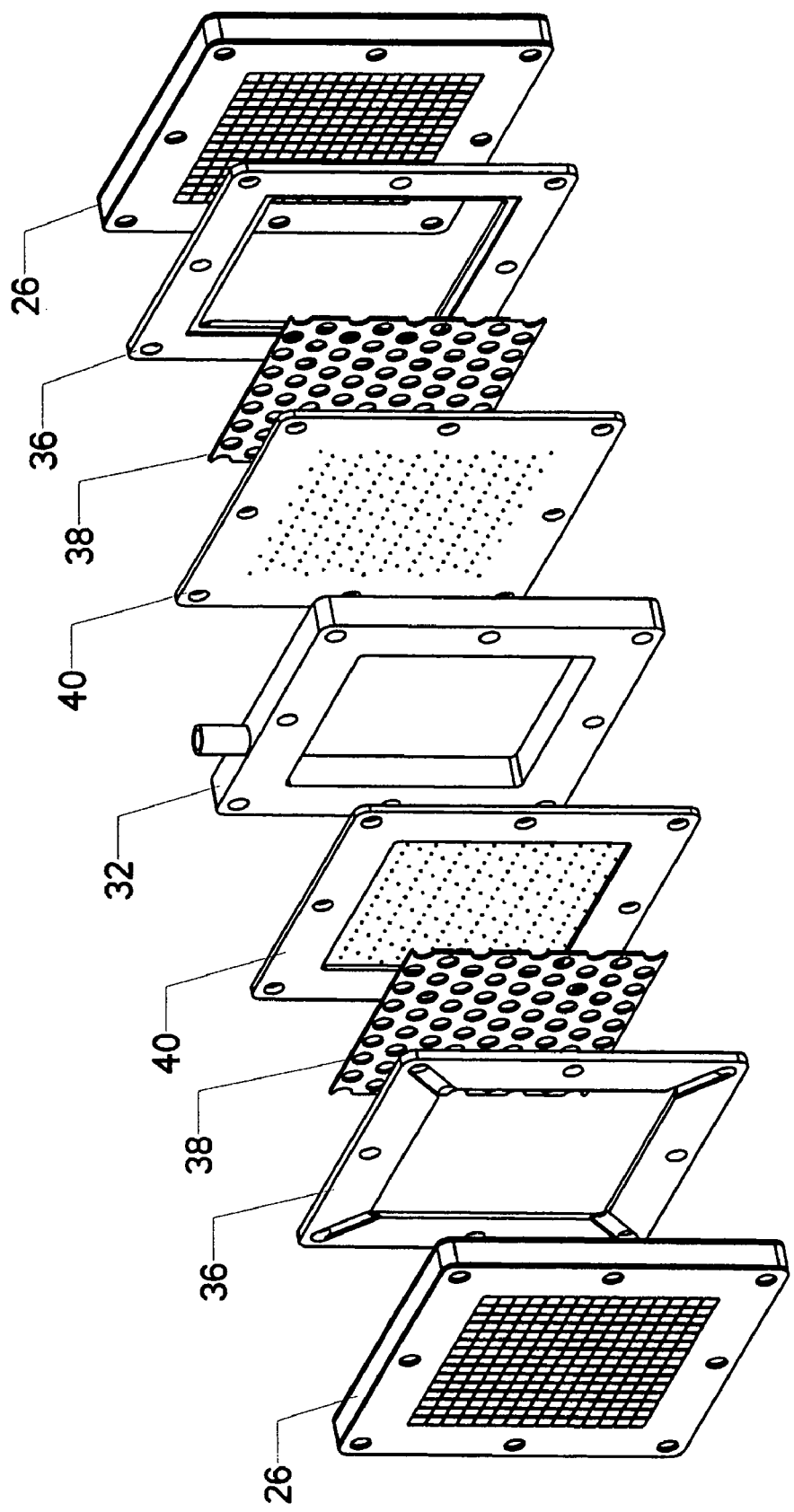
FIG. 9 is an exploded perspective view, showing how to create a stacked fuel cell using the present invention.

The structure of the present invention suggests a different arrangement. FIG. 9 shows a single oxygen manifold 32 being used to feed two microjet plates 40 (facing in opposite directions). Each microjet plate feeds through an impingement plate and to a membrane electrode assembly 26.

Figure 10:
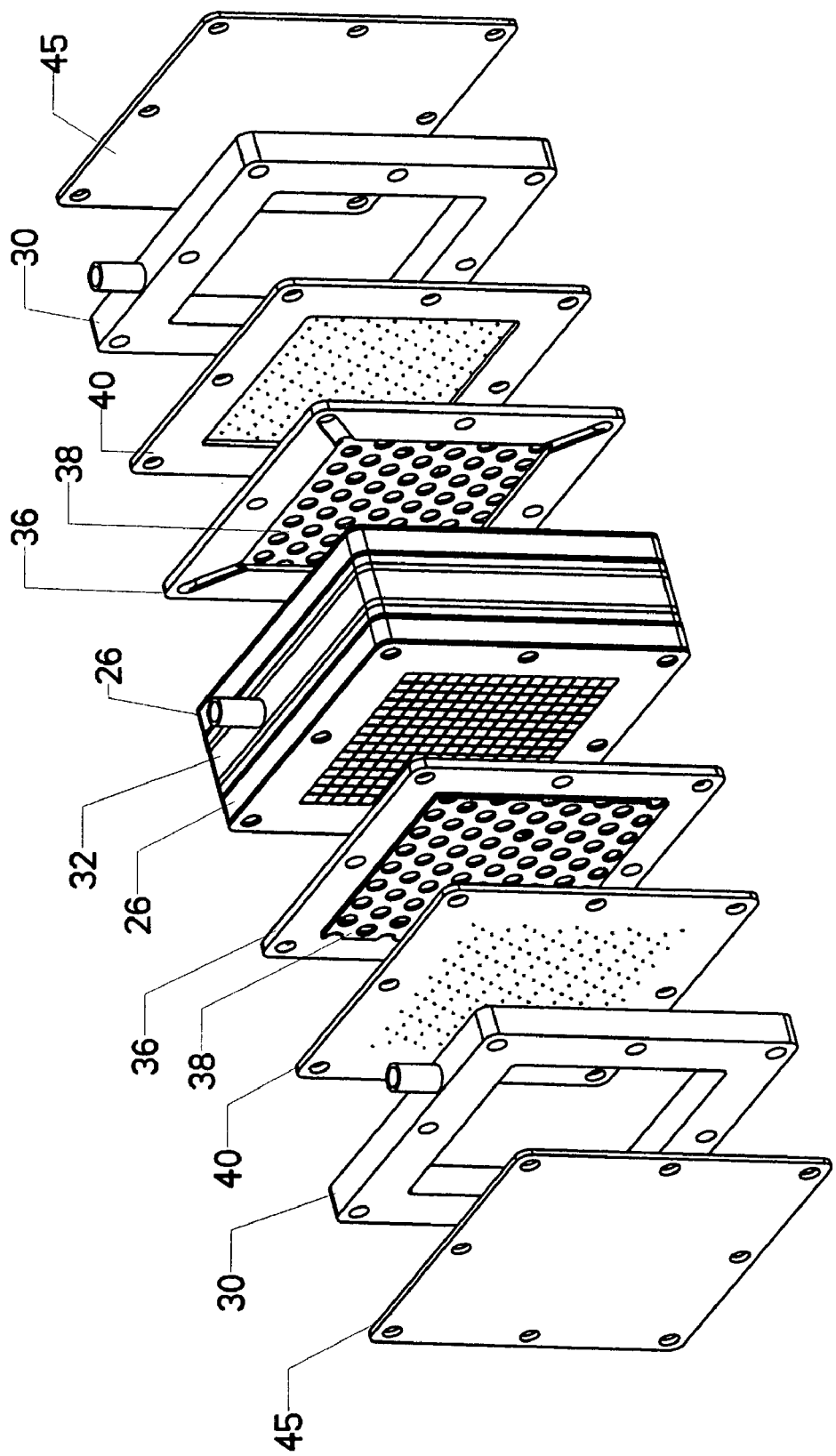
FIG. 10 is an exploded perspective view, showing how to create a stacked fuel cell using the present invention.

In FIG. 10, all the components shown in FIG. 9 have been clamped together into the unified "block" shown in the middle. The two MEAs 26 then form the outward facing portions. FIG. 10 shows a pair of exploded hydrogen supply components in position and ready to be clamped onto the central block.

Once all the components are clamped together, the pair of hydrogen manifolds 30 will feed hydrogen through microjet and impingement plates through to the two MEAs. The polarity of this assembly will then be negative-positive-positive-negative, so it is not possible to simply connect adjacent portions together in series. Instead, alternating bus bar arrangements must be made in order to create the positive-negative-positive-negative arrangement needed to obtain higher voltages. These bus bars are housed within the conduit holes.

Since the stack will not have the conventional positive-negative-positive-negative arrangement, it may be undesirable to use graphite for the manifolds (which would make the manifolds themselves act as the electrodes. Separate electrodes may be preferable. These will be porous components likely formed on the outer surfaces of the MEA itself. The bus bars will then be used to conduct the electricity out of each cell.

Of course, the stack shown in FIG. 10 is not limited to two cells. Two more microjet and MEA assemblies can be substituted for the end plates and the stack can be extended in both directions for many additional cells. These principles are well understood by those skilled in the art and are therefore not further illustrated.

Figure 11:
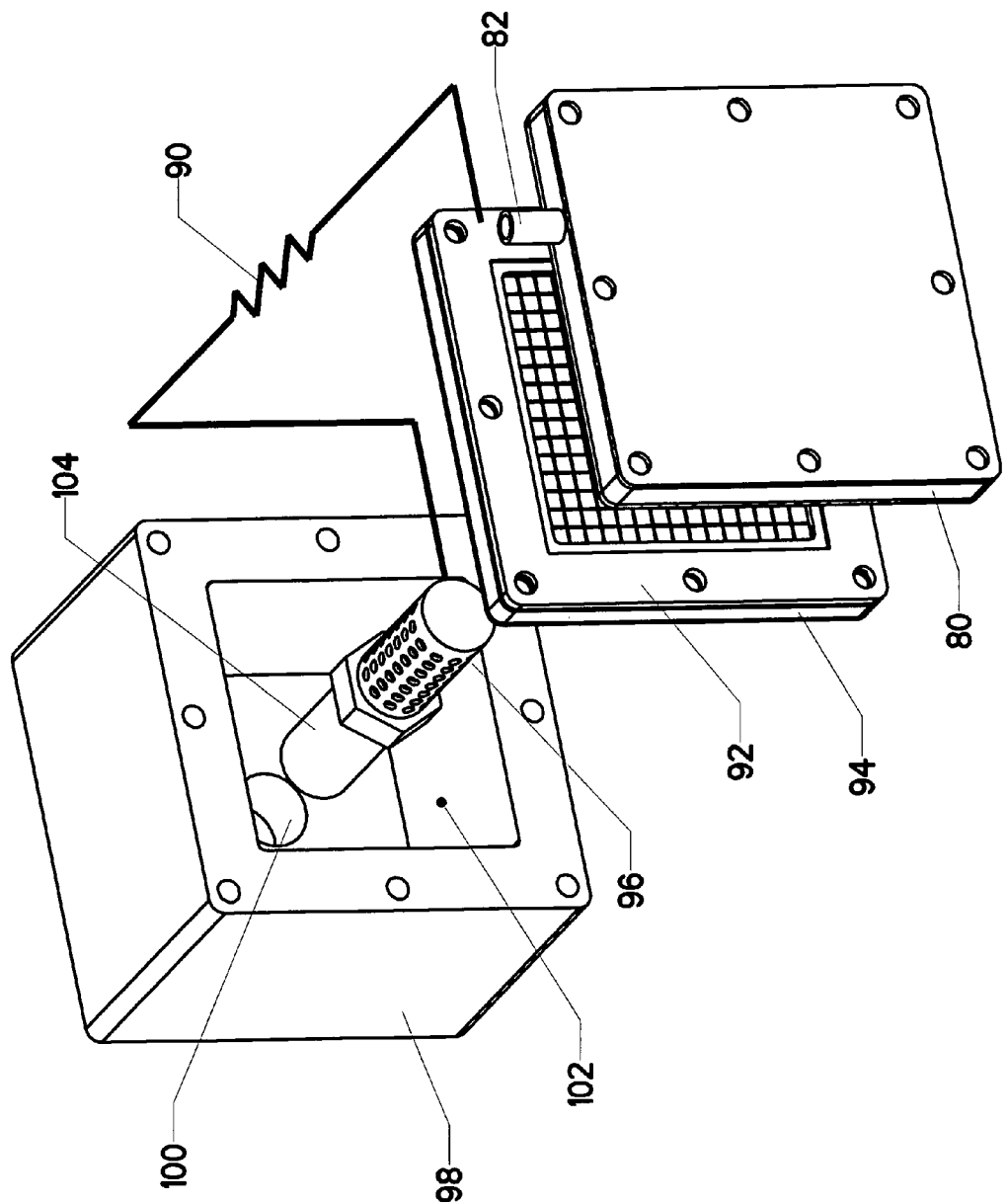
FIG. 11 is an exploded perspective view, showing an alternate embodiment of the present invention.
Figure 12:
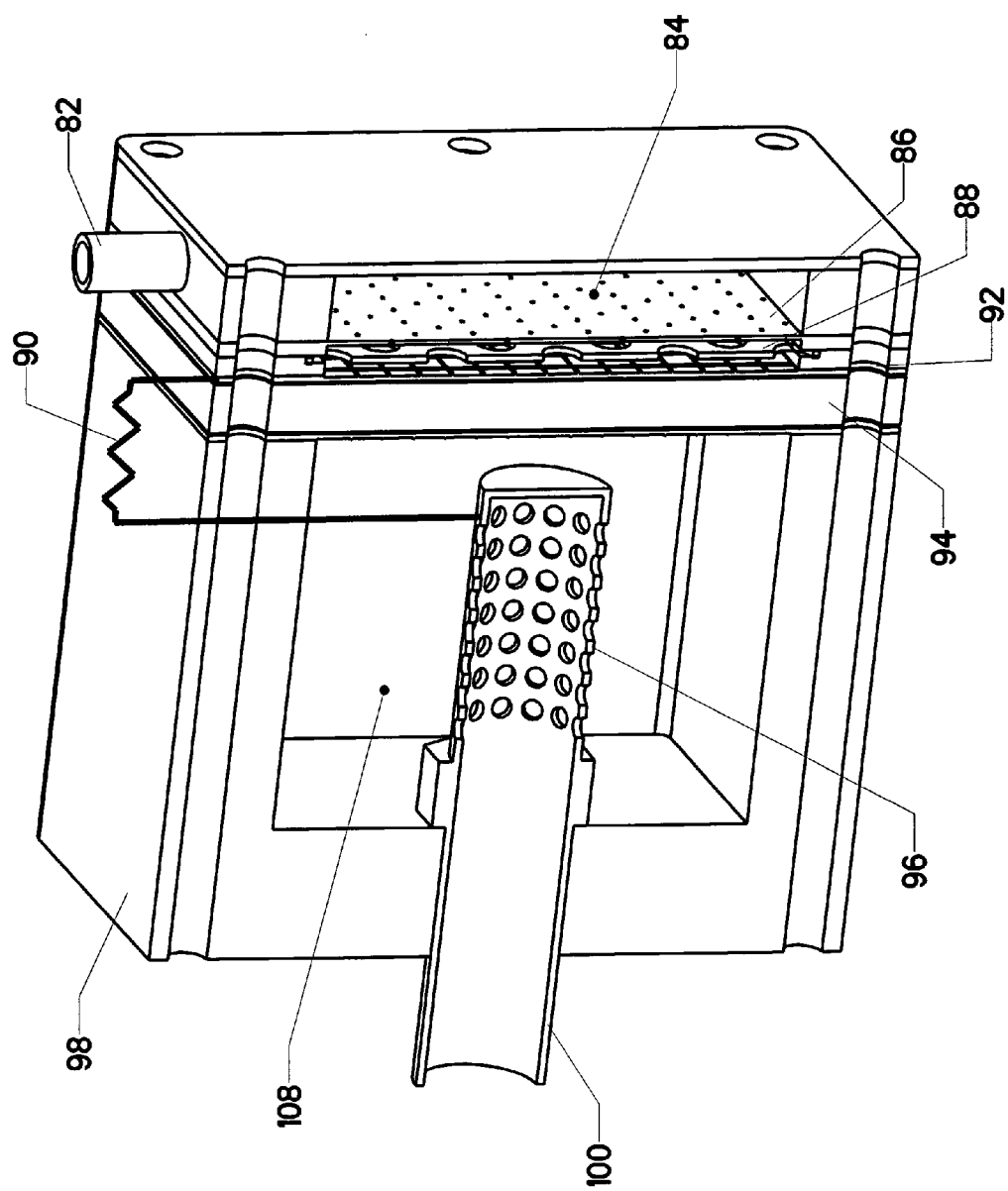
FIG. 12 is a section view, showing an alternate embodiment of the present invention.

Another embodiment of the present invention is illustrated in FIGS. 11 and 12. In this embodiment an electrolytic, alkaline solution is used on one side of the assembly to carry positively charged hydrogen protons to the proton exchange membrane. As illustrated in FIG. 11, the assembly includes oxygen manifold 80 having stagnation chamber 84 which is fluidly connected to oxygen supply line 82. Microjet plate 86, impingement plate 88, oxygen electrode 92, and proton exchange membrane 94 are arranged in the same configuration as previously described.

Hydrogen manifold 98 has aqueous chamber 102 which contains the electrolytic, alkaline solution. Hydrogen electrode 96 is attached to hydrogen supply line 100 by threaded connector 104. Hydrogen electrode 96 and oxygen electrode 92 are connected to an electrical circuit including load 90.

FIG. 12 illustrates the assembly of FIG. 11 in an assembled state. It is sectioned in half to aid visualization. Microjet plate 86, impingement plate 88, oxygen electrode 92 and proton exchange membrane 94 are sandwiched together between oxygen manifold 80 and hydrogen manifold 98 (as for the previously-described embodiments). Alkaline solution 108 fills the aqueous chamber. It is important that the alkaline solution have a pH of at least about 12.0 or greater for effective operation of the fuel cell. A 1 molar solution of potassium hydroxide in water is particularly effective.

Oxygen is fed to stagnation chamber 84 through oxygen supply line 82. The oxygen is forced through microjet holes in microjet plate 86 and diffused by impingement plate 88 as previously described.

Hydrogen is fed through hydrogen supply line 100 to hydrogen electrode 96. The hydrogen electrode includes a hollow interior which feeds the hydrogen gas out through perforations extending through its wall (shown best in FIG. 12). Electrons are stripped off of the hydrogen molecules and pass through the electrical circuit and load 90. The positively charged hydrogen protons are then able to pass through proton exchange membrane 94 where they react with oxygen to form water. The water is then transmitted out of the assembly through an exhaust port. Because the reaction occurs on the oxygen side of the membrane, the water does not dilute alkaline solution 108.

The readers should bear in mind that the structure shown for the hydrogen electrode is meant to be representative rather than an actual working version. In reality, the diameter of the perforations would likely be much smaller (and therefore harder to see in the illustrations). The size and shape of the hydrogen electrode might be substantially different as well. None of these modifications would alter the invention's structural nature.

The preceding description contains significant detail regarding the novel aspects of the present invention. It should not be construed, however, as limiting the scope of the invention but rather as providing illustrations of the preferred embodiments of the invention. As one example, new proton exchange membranes are being developed which do not require humidification in order to be effective. The present invention could function with these newer "dry" membranes just as well as for the "wet" membranes described in the examples. Accordingly, the scope of the invention should be fixed by the following claims, rather than by the examples given.

What is claimed is:

1. A fuel cell for reacting a first reactant with a second reactant comprising:
   a. an exchange membrane having a first side and a second side;
   b. a first input being configured to supply said first reactant to said fuel cell on said first side of said exchange membrane;
   c. a second input being configured to supply said second reactant to said fuel cell on said second side of said exchange membrane;
   d. a first stagnation chamber located on said first side of said exchange membrane, being configured to receive said first reactant from said first input;
   e. a first microjet plate located on said first side of said exchange membrane, said first microjet plate bounding said first stagnation chamber and comprising a plurality of microjet openings passing through said first microjet plate;
   f. a first impingement plate located on said first side of said exchange membrane and lying between said exchange membrane and said first microjet plate, said first impingement plate having a surface containing a plurality of exhaust openings and a plurality of webs lying between said plurality of exhaust openings; and
   g. wherein said plurality of microjet openings in said first microjet plate and said plurality of webs in said first impingement plate are positioned so that each gas microjet produced by each of said plurality of microjet openings strikes one of said plurality of webs, and the decelerated gas thereafter flows through said plurality of exhaust openings in said first impingement plate toward said exchange membrane.

2. A fuel cell as recited in claim 1, wherein said first reactant is oxygen and said second reactant is hydrogen.

3. A fuel cell as recited in claim 1, further comprising:
   a. a second stagnation chamber located on said second side of said exchange membrane, being configured to receive said second reactant from said second input;
   b. a second microjet plate located on said second side of said exchange membrane, said second microjet plate bounding said second stagnation chamber and comprising a plurality of microjet openings passing through said second microjet plate;

c. a second impingement plate located on said second side of said exchange membrane and lying between said exchange membrane and said second microjet plate, said second impingement plate having a surface containing a plurality of exhaust openings and a plurality of webs lying between said plurality of exhaust openings; and d. wherein said plurality of microjet openings in said second microjet plate and said plurality of webs in said second impingement plate are positioned so that each gas microjet produced by each of said plurality of microjet openings strikes one of said plurality of webs, and the decelerated gas thereafter flows through said plurality of exhaust openings in said second impingement plate toward said exchange membrane.

4. A fuel cell as recited in claim 3, wherein said first reactant is oxygen and said second reactant is hydrogen.

5. A fuel cell as recited in claim 1, further comprising:
a. an aqueous chamber located on said second side of said exchange membrane, said aqueous chamber configured to receive and contain an alkaline solution; and
b. an electrode located within said aqueous chamber, being configured to diffuse said second reactant into said alkaline solution within said aqueous chamber.

6. A fuel cell as recited in claim 5, wherein said first reactant is oxygen and said second reactant is hydrogen.

7. A fuel cell as recited in claim 1, further comprising:
a. an aqueous chamber located on said second side of said exchange membrane;
b. wherein said aqueous chamber is filled with an alkaline solution; and
c. an electrode located within said aqueous chamber, being configured to diffuse said second reactant into said alkaline solution within said aqueous chamber.

8. A fuel cell as recited in claim 7, wherein said first reactant is oxygen and said second reactant is hydrogen.

9. A fuel cell as recited in claim 7, wherein said alkaline solution has a pH of at least about 12.0.

10. A fuel cell as recited in claim 7, wherein said alkaline solution is about a 1 molar solution.

11. A fuel cell as recited in claim 7, wherein said alkaline solution is potassium hydroxide.

12. A fuel cell as recited in claim 8, wherein said alkaline solution has a pH of at least about 12.0.

13. A fuel cell as recited in claim 8, wherein said alkaline solution is about a 1 molar solution.

14. A fuel cell as recited in claim 8, wherein said alkaline solution is potassium hydroxide.

* * * * *